(12) United States Patent
Silverstein

(10) Patent No.: US 7,061,532 B2
(45) Date of Patent: Jun. 13, 2006

(54) SINGLE SENSOR CHIP DIGITAL STEREO CAMERA

(75) Inventor: Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 09/818,922

(22) Filed: Mar. 27, 2001

(65) Prior Publication Data

US 2002/0140835 A1 Oct. 3, 2002

(51) Int. Cl.
*H04N 5/225* (2006.01)
*H04N 13/00* (2006.01)

(52) U.S. Cl. .................... 348/335; 348/42; 348/342
(58) Field of Classification Search .............. 348/42, 348/45, 49, 58, 65, 335; 359/371, 376, 462
See application file for complete search history.

(56) References Cited

U.S. PATENT DOCUMENTS

| | | | |
|---|---|---|---|
| 4,523,809 A | | 6/1985 | Taboada et al. |
| 4,761,066 A | * | 8/1988 | Carter .......................... 359/371 |
| 5,541,642 A | | 7/1996 | Ashbey |
| 5,557,324 A | * | 9/1996 | Wolff .......................... 348/335 |
| 5,790,086 A | | 8/1998 | Zelitt |
| 5,832,325 A | | 11/1998 | Ito et al. |
| 5,940,126 A | * | 8/1999 | Kimura ........................ 348/65 |
| 6,038,071 A | * | 3/2000 | Chikazawa .................. 349/49 |
| 6,044,232 A | | 3/2000 | Pan |
| 6,128,132 A | | 10/2000 | Wieland et al. |
| 6,195,150 B1 | | 2/2001 | Silverbrook |
| 6,346,965 B1 | * | 2/2002 | Toh .............................. 348/49 |
| 6,624,935 B1 | * | 9/2003 | Weissman et al. ............ 348/49 |
| 6,674,462 B1 | * | 1/2004 | Ooshima et al. .............. 346/42 |
| 2001/0004298 A1 | * | 6/2001 | Kobayashi ................... 359/462 |

FOREIGN PATENT DOCUMENTS

WO WO00/50927 8/2000

OTHER PUBLICATIONS

Edward H. Adelson and John Y. A. Wang, Single Lens Stereo with a Plenoptic Camera, IEEE Transactions on Pattern Analysis and Machine Intelligence, vol. 14, No. 2, Feb. 1992.

P. von Ballmoos et al., Crystal Diffraction Telescopes for Nuclear Astrophysics.

Kam Y. Lau and Richard S. Muller, Adaptive Micromechanical Technologies for Optoelectronics Modules and Systems, Semiannual Report Jan.-Jun. 1998, DARPA Project No.: DABT63-95-C-0055.

* cited by examiner

*Primary Examiner*—Ngoc-Yen Vu
*Assistant Examiner*—Luong T. Nguyen

(57) ABSTRACT

A digital stereo camera using a single sensor array to take both left and right images for stereo (three-dimensional) image capture. In one embodiment, a micro-lens array is used to focus, at a first instant in time, light ("left light") from a left lens system onto a sensor array for left image capture. Then, the micro-lens array is moved to focus light ("right light") from a right lens system onto the sensor array for right image capture. In another embodiment, a portion of the left light (the portion having a first polarized direction) and a portion of the right light (the portion having a second polarized direction) are directed to a sensor array; the second polarized direction being orthogonal to the first polarized direction. To capture the left image, a polarization filter is used to allow the left light (having the first polarized direction) to pass toward the sensor array while preventing the right light (having the second polarized direction) from reaching the sensor array. To capture the right image, polarization direction of the polarization filter is switched to allow only the right light (having the second polarized direction) to reach the sensor array.

8 Claims, 4 Drawing Sheets

SINGLE SENSOR CHIP DIGITAL STEREO CAMERA

BACKGROUND

The present invention relates to the art of capturing images. More particularly, the present invention relates to digital stereo camera capturing stereoscopic images.

Stereo (or 3-dimensional ("3D")) imaging involves capturing two images—a "left image" and a "right image"—of a scene, the images captured from two different viewpoints. Typically, the two viewpoints are horizontally displaced from each other. The horizontal displacement is typically about 65 mm, an average distance between a person's eyes. When the left image is viewed by the left eye and the right image by the right eye a 3D image is presented to the person's brain. In this document, the term "camera" is used to designate apparatus for capturing still images as well as moving, or video, images.

Various methods have been used to capture the stereo images. For instance, a non-stereo camera can be used to capture a scene in stereo by capturing the scene using two sequential exposures, the exposures being made from two different viewpoints. More conveniently, a stereo camera may be used. A stereo camera usually has two lens systems—a left lens system and a right lens system—to capture a 3D image. A left image is captured by a first film and a right image by a second film.

For digital stereo cameras, two sensor arrays are used—a first sensor arrays to capture the left image and a second sensor arrays to capture the right image. However, the use of two sensor arrays decreases reliability while increasing the cost and the weight of the digital stereo camera. There is a need for a digital stereo camera capable of taking stereo images using only one sensor array.

SUMMARY

The need is met by the present invention. According to one aspect of the present invention, a camera includes a left lens system, a right lens system, and a light sensor array. Further, the camera has a micro-lens array for focusing light from the left lens system to a first portion of the light sensor array and for focusing light from the right lens system to a second portion of the light sensor array. The micro-lens array is moved by a means for moving the micro-lens array such that light from the left lens system is focused on the second portion of the light sensor array and light from the right lens system is focused on the first portion of the light sensor array.

According to a second aspect of the present invention, a camera includes a left lens system, a right lens system, a light sensor array, and a polarizing beam splitter (PBS). The PBS combines light from the left lens system and light from the right lens system. A polarization filter is used to select between light from the left lens system and light from the right lens system.

According to a third aspect of the present invention, a camera includes a left lens system, a right lens system, and a polarizing beam splitter (PBS). The PBS combines light from the left lens system and light from the right lens system. The camera further includes a light sensor array having polarized filter allowing one half of sensors of the light sensor array to capture light from the left lens system and the other half of sensors of the light sensor array to capture light from the right lens system.

According to a fourth aspect of the present invention, a method of capturing a left image and a right image of a scene is disclosed. First, light from a left lens system is focused on a sensor array allowing the sensor array to capture the left image at a first instant in time. Next, light from a right lens system is focused on the sensor array allowing the sensor array to capture the right image at a second instant in time.

According to a fifth aspect of the present invention, a method of capturing a left image and a right image of a scene is disclosed. First, left polarized light from a left lens system is directed toward a sensor array. Next, right polarized light from a right lens system is directed toward the sensor array, the light polarized in a second direction, orthogonal to the first direction. Then, the left polarized light is selected to capture the left image using a sensor array. Finally, the right polarized light is selected to capture the right image using the sensor array.

Other aspects and advantages of the present invention will become apparent from the following detailed description, taken in combination with the accompanying drawings, illustrating by way of example the principles of the invention.

DETAILED DESCRIPTION

Figure 1:
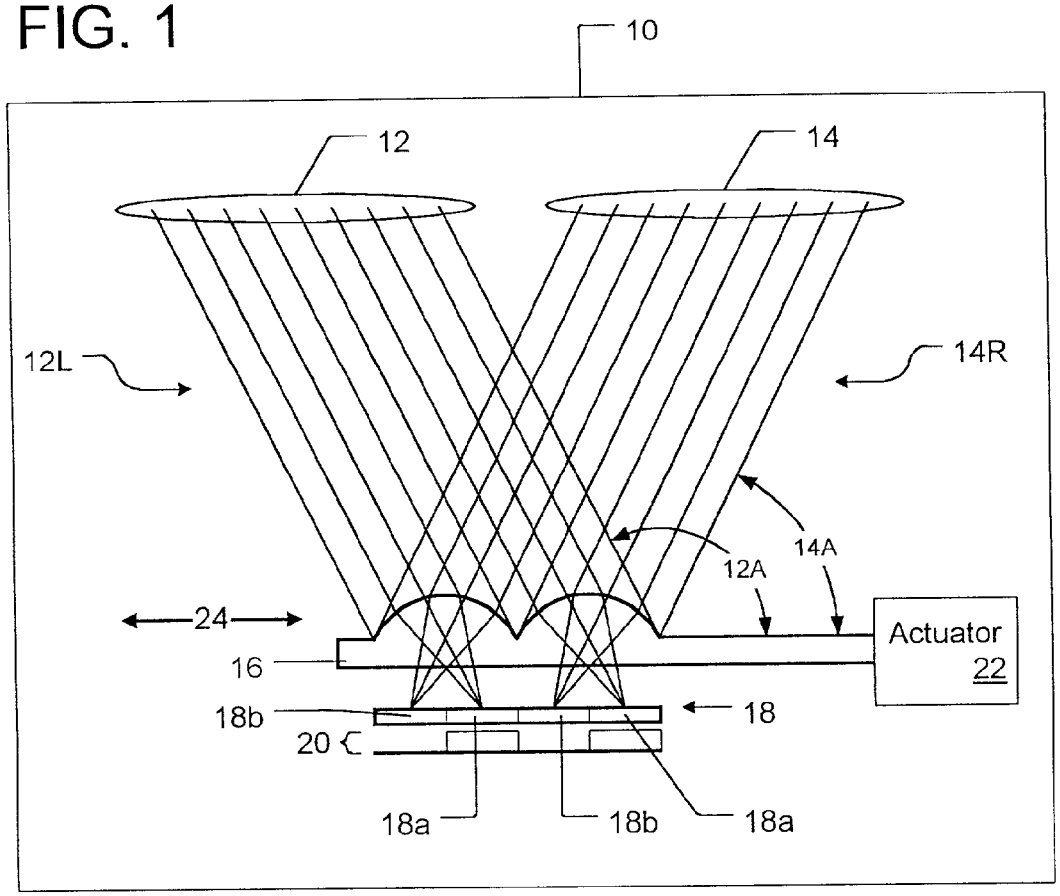
FIG. 1 is a simplified diagram of a top view of an apparatus according to one embodiment of the present invention.

As shown in the drawings for purposes of illustration, the present invention is embodied in a camera including a left lens system, a right lens system, and a light sensor array. Further, the camera has a micro-lens array for focusing light from the left lens system to a first portion of the light sensor array and for focusing light from the right lens system to a second portion of the light sensor array. The micro-lens array is moved by a means for moving the micro-lens array such that light from the left lens system is focused on the second portion of the light sensor array and light from the right lens system is focused on the first portion of the light sensor array.

Because only one sensor array is required to capture both the left image and the right image, the camera of the present invention has higher reliability, lower cost, and lower weight.

Referring to FIG. 1, a simplified diagram of an apparatus 10 according to one embodiment of the present invention is illustrated. The apparatus 10 can be a stereo camera and includes a left lens system 12 ("left lens") and a right lens system 14 ("right lens"). For brevity, each of the lens systems 12 and 14 is illustrated as a single elliptical lens. Light from a scene (images of which are to be captured by the stereo camera 10) enters the camera 10 via the lens systems 12 and 14. Left light (generally indicated by reference number 12L) from the left lens 12 is directed toward a micro-lens array 16 at a first angle 12A. Right light (generally indicated by reference number 14R) from the right lens 14 is directed toward a micro-lens array 16 at a second angle 14A. The first angle 12A should be greater than 90 degrees by at least several degrees depending on the characteristics of the lens 12 and by the amount of defocus that could be present in the lens 12. Blur circle on sensor 20 limits how close the first angle 12A can be to 90 degrees. Further, the first angle 12A could be as much as 135 degrees or so, and the maximum value dependents on the material used to make the lens 12 and the shape of the lens 12. Likewise the second angle 14A should be smaller than 90 and larger than around 45 depending on the second lens 14, the sensor 20, or both.

In one embodiment, the micro-lens array 16 is a lenticular array having semi-cylindrical portions.

Figure 2:
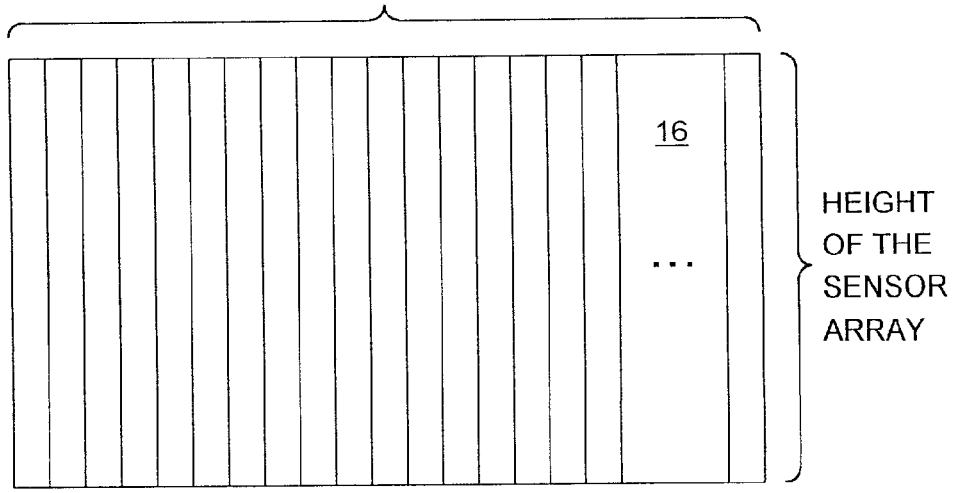
FIG. 2 is a front view of a micro-lens array according to one embodiment of the present invention.

FIG. 2 illustrates a front view of the lenticular array 16 according to one embodiment of the present invention. In FIG. 1, the lenticular array 16 is illustrated with only two semi-cylindrical portions for brevity and ease of illustration; however, in practice, the lenticular array 16 may include as many semi-cylindrical portions necessary to implement the invention. This may require the lenticular array 16 to include as many semi-cylindrical portions as there are rows or columns of individual sensors in the sensor array 20.

In the illustrated implementation, the lenticular array 16 focuses the lights 12L and 14R on a focal plane 18 thereby producing images on the focal plane 18. The left light 12L to is focused on a first portion 18a of the plane 18 and the right light 14R is focused on a second portion 18b of the plane 18. Here, the first portion 18a includes alternating columns of the focal plane 18 and the second portion 18b includes the other alternating columns of the focal plane 18.

The sensor array 20 is illustrated as being under the focal plane 18 for the purposes of illustration; however, in practice, the sensor array 20 is at the focal plane 18 to capture the images rendered by the focused lights 12L and 14R.

Figure 3:
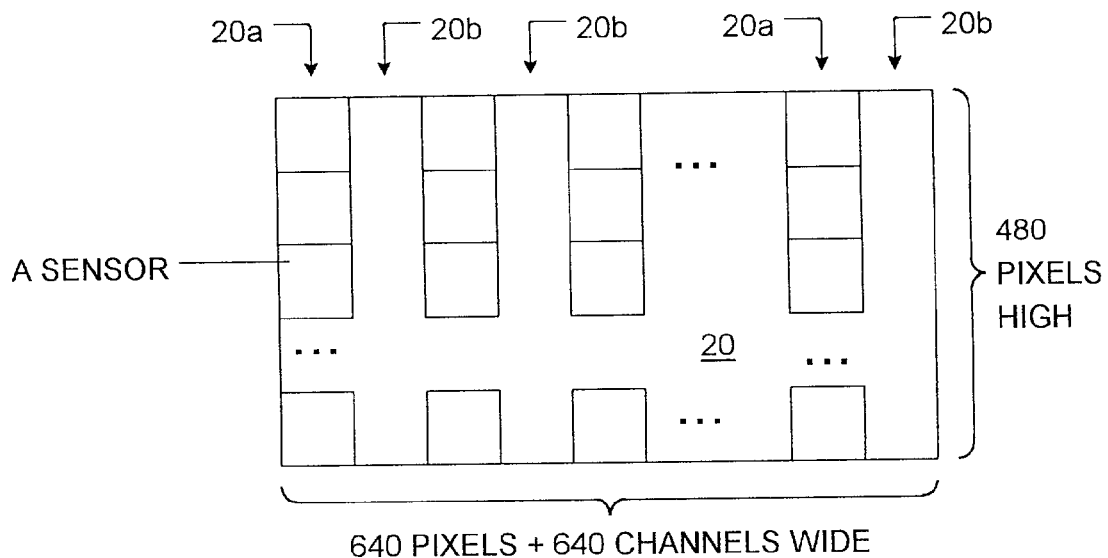
FIG. 3 illustrates one embodiment of a sensor array of the present invention as used by the apparatus of FIG. 1.

One embodiment of the sensor array 20 is illustrated by FIG. 3. Sensors of the sensor array 20 are arranged in columns 20a with channel columns 20b between the sensor columns 20a. The sensor columns 20a correspond with the first portion 18a of the focal plane 18 and may be referred to as the first portion 20a of the sensor array 20. The channel columns 20b correspond with the second portion 18b of the focal plane 18 and may be referred to as the second portion 20b of the sensor array 20.

For example, to capture an image having 680 by 480 resolution, the sensor array 20 has 480 rows and 680 columns 20a of sensors, the columns separated by channels 20b. Each sensor representing a pixel on the captured image.

At a first instant in time, the micro-lens array 16 focuses the left light 12L on the first portion 20a of the sensor array 20 while focusing the right light 14R on the second portion 20b of the sensor array 20. At that time, the sensors are read thereby capturing a left image—the image rendered by the left light 12L.

Next, the actuator 22 activates and moves the micro-lens array 16 such that the right light 14R is focused on the first portion 20a of the light sensor array 20 and the left light 12L is focused on the second portion 20b of the light sensor array 20. Then, at a second instant in time, the sensors are read thereby capturing a right image—the image rendered by the right light 14R.

The actuator 22 may be implemented using a piezoelectric material. Such actuators 22 and other means for effectuating mechanical movement is known in the art, and can be implemented to move the micro-lens array 16. The direction of movement of the micro-lens array 16 is indicated by a double-directed line 24. The second instant in time follows the first instant in time by $\frac{1}{15}^{th}$ of a second or less.

Following the capture of the right image, the actuator 22 is deactivated to allow the micro-lens array 16 to move back to its initial position.

Figure 4:
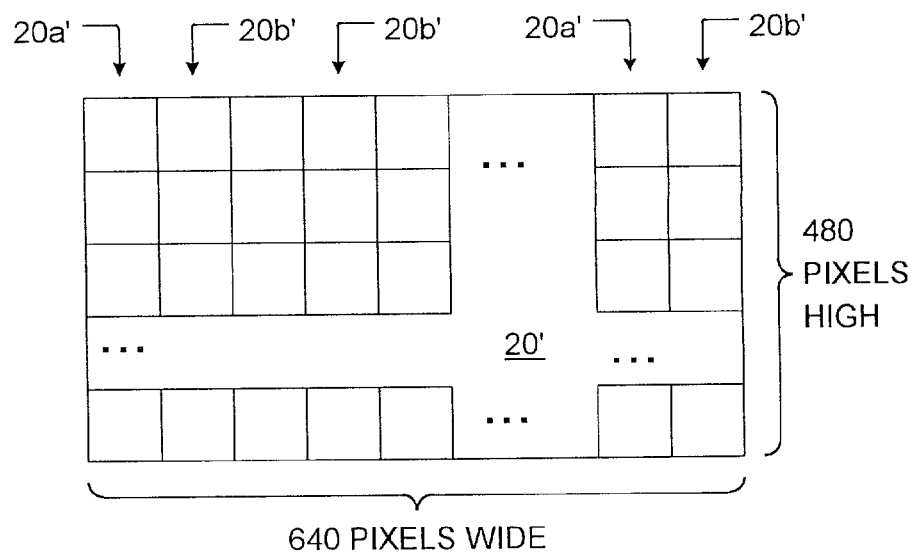
FIG. 4 illustrates another embodiment of a sensor array of the present invention as used by the apparatus of FIG. 1.

FIG. 4 illustrates another embodiment of the sensor array 20 of FIGS. 1 and 3. For convenience, components in FIG. 4 that are similar to components in FIGS. 1 and 3 are assigned the same reference numerals, analogous but changed components are assigned the same reference numerals accompanied by a apostrophe, "'", and different components are assigned different reference numerals.

Here, the sensor array 20' includes a first portion 20a' and a second portion 20b'. At the first instant in time, the left image is captured by the first portion 20a' sensors and the right image is captured by the second portion 20b' sensors. Accordingly, each of the images has ½ of the resolution (or the number of pixels) of the sensor array 20'.

To obtain both the left and the right images each having full sensor resolution, another, a second, set of images (left and right images) can be taken at the second instant in time following the movement of the micro-lens array 16 to have the micro-lens array 16 focus the left light 12L on the second portion 20b' of the sensor array 20' and the right light 14R on the first portion 20a' of the sensor array 20'. Then, the second set of images (left and right images) can be combined with the first set of images (left and right images) to produce two combined images (one for left image and one for right image), each having the full sensor resolution.

Figure 5:
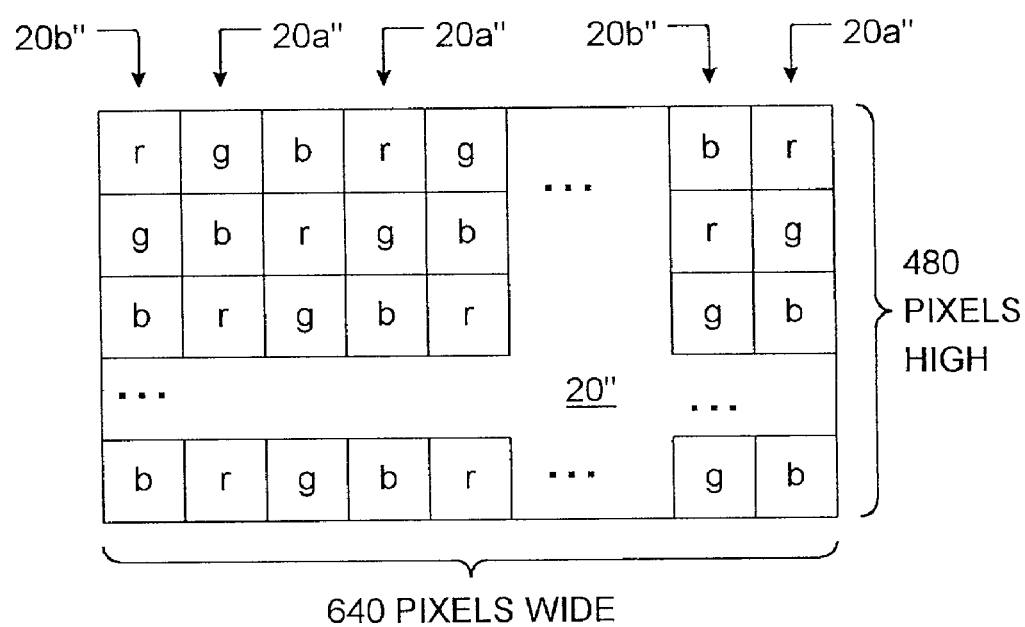
FIG. 5 illustrates yet another embodiment of a sensor array of the present invention as used by the apparatus of FIG. 1.

This technique can be implemented for color sensor arrays having a mosaic layout of its sensors as illustrated in FIG. 5. FIG. 5 illustrates yet another embodiment of the sensor array 20 of FIGS. 1 and 13 but having an alternative configuration. For convenience, components in FIG. 5 that are similar to components in FIGS. 1 and 3 are assigned the same reference numerals, analogous but changed components are assigned the same reference numerals accompanied by a double-apostrophe, "''", and different components are assigned different reference numerals. In the mosaic sensor array 20", sensors marked with an "r" represent red sensors, or sensors that detect red portion of the light spectra; "g" represent green sensors; and "b" represent blue sensors.

Using the mosaic color sensor array 20", at the first instance, the first portion 20a" of the sensor array 20" captures the left image at ½ the resolution and the second portion 20b" of the sensor array 20" captures the right image at ½ the resolution. Then, at the second instance in time, the first portion 20a" of the sensor array 20" captures the right image at ½ the resolution and the second portion 20b" of the sensor array 20" captures the left image at ½ the resolution. Then, the second set of images (left and right images) are combined with the first set of images (left and right images) to produce two combined images (one for left and one for right image), each having the full sensor resolution.

Figure 6:
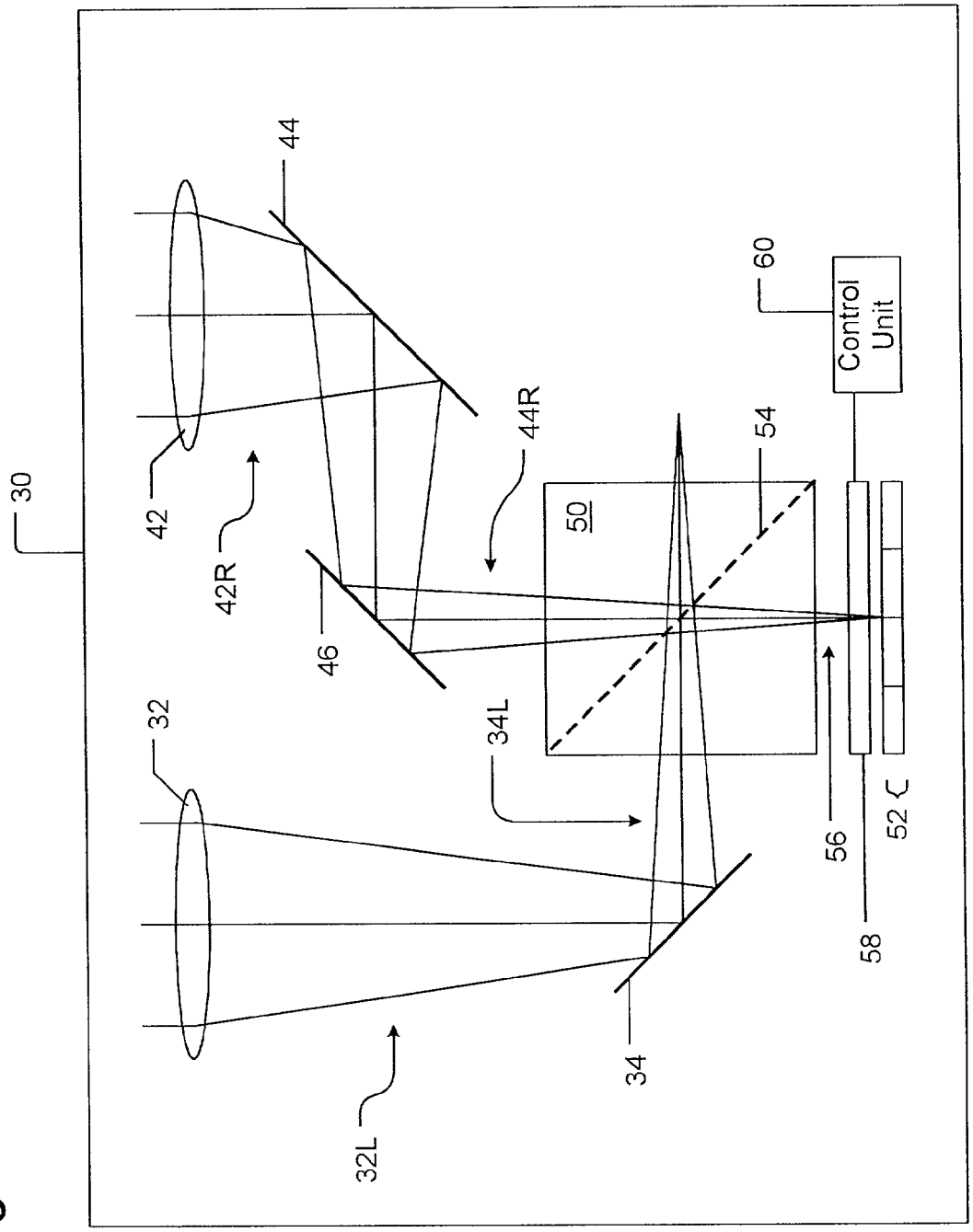
FIG. 6 is a simplified diagram of a top view of an apparatus according to another embodiment of the present invention.

An alternative embodiment of the apparatus 30, a digital camera, of the present invention is illustrated by FIG. 6. Referring to FIG. 6, the camera 30 includes a left lens system and a right lens system. The left lens system includes optics 32 for receiving left light 32L and a left mirror 34 for directing the left light 32L to a polarizing beam splitter (PBS) 50. The right lens system includes optics 42 for receiving right light 42R and mirrors 44 and 46 for directing the right light 42R to the PBS 50.

The PBS 50 combines the left light and the right light by reflecting directed left light 34L toward a sensor array 52 and by allowing directed right light 44R to pass toward the sensor array 52.

The PBS 50 includes a polarizing beam splitter film (PBS Film) 54 that reflects light polarized in a first direction but passes through light polarized in a second direction (orthogonal to the first direction).

Consequently, only a portion (that is polarized in the first direction) of the directed left light 34L is reflected by the PBS 50 towards the sensor array 52 while the rest of the directed left light 34L is pass through the PBS 50. Similarly, only a portion (that is polarized in the second direction) of the directed right light 44R passes through the PBS 50 toward the sensor array 52 while the rest of the directed right light 44R is reflected off.

A combined light 56 then includes a portion of the directed left light 34L having the first polarized direction and a portion of the directed right light 44R having the second polarized direction.

The combined light 56 passes through a polarization filter 58. In one embodiment, the filter 58 is a static filter having a first portion that allows only light having the first polarization direction to pass and a second portion that allows only light having the second polarization direction to pass. In this embodiment, the first portion of the filter 58 allows the directed left light 34L portion of the combined light 56 to pass because the directed left light 34L portion is polarized in the first direction. Likewise, the second portion of the filter 58 allows the directed right light 44R portion of the combined light 56 to pass because the directed right light 44R is polarized in the second direction. The filter 58 is designed having alternating first and second portions, therefore, corresponding portions of the sensor array 52 captures left and right images. The static filter 58 can be fabricated with the sensor array 52. In this case, one half of sensors of the light sensor array 52 capture light from the left lens system and the other half of sensors of the light sensor array 52 to capture light from the right lens system.

Alternatively, the polarization filter 58 may be an active filter such as a liquid crystal filter. Then, the filter 58 may be switched from a first state to a second state. When the filter 58 is in the first state, the filter 58 passes all light having the first polarization direction thus allowing the sensor to capture the image rendered by the directed right light 44R. In the second state, the filter 58 passes all light having the second polarization direction thus allowing the sensor to capture the image rendered by the directed left light 34L. The state of the filter 58 may be controlled by application of electric signals from a control unit 60. The use of such liquid crystal filter to filter polarized light is known in the art.

From the foregoing, it will be appreciated that the present invention is novel and offers advantages over the current art. The present invention includes an apparatus to capture stereo images using only a single sensor array. Although a specific embodiment of the invention is described and illustrated above, the invention is not to be limited to the specific forms or arrangements of parts so described and illustrated. For example, other means for actuating the micro-lens array may be used. The invention is limited by the claims that follow.

What is claimed is:

1. A camera comprising:
   a left lens system;
   a right lens system;
   a light sensor array;
   a polarizing beam splitter (PBS) for combining light from the left lens system and light from the right lens system;
   a polarization filter for selecting between light from the left lens system and light from the right lens system, wherein the polarization filter is a liquid crystal device; and
   a control unit for controlling the liquid crystal polarization filter to select between light from the left lens system and light from the right lens system.

2. The camera recited in claim 1 further comprising a sensor array to capture the selected light.

3. A camera comprising:
   a left lens system;
   a right lens system;
   a polarizing beam splitter (PBS) for combining light from the left lens system and light from the right lens system;
   a light sensor array having a polarization filter allowing one half of sensors of the light sensor array to capture light from the left lens system and the other half of sensors of the light sensor array to capture light from the right lens system, wherein said polarization filter is a liquid crystal window; and
   a control unit for switching said liquid crystal window between a first state wherein said polarization filter passes light having a first polarization direction and a second state, wherein said polarization filter passes light having a second polarization direction different from said first polarization direction.

4. A method of capturing a left image and a right image of a scene, the method comprising:
   focusing light from a left lens system on a sensor array;
   capturing, using the sensor array, the left image at a first instant in time;
   focusing light from a right lens system on the sensor array;
   capturing, using the sensor array, the right image at a second instant in time using the sensor array; and
   using an electrically controllable liquid crystal filter to selectively capture said left image and said right image.

5. A method of capturing a left image and a right image of a scene, the method comprising:
   directing left polarized light from a left lens system on a sensor array, the light polarized in a first direction;
   directing right polarized light from a right lens system on the sensor array, the light polarized in a second direction, orthogonal to the first direction
   selecting the left polarized light, by switching a liquid crystal filter to a first state wherein it passes said left polarized light, to capture the left image using the sensor array; and
   selecting the right polarized light, by switching a liquid crystal filter to a second state wherein it passes said right polarized light, to capture the right image using the sensor array.

6. The method recited in claim 5 further comprising combining the left polarized light and the right polarized light.

7. The method recited in claim 6 wherein a polarized beam splitter (PBS) combines the left polarized light and the right polarized light.

8. The method recited in claim 4, wherein the left light is focused on the sensor array by a polarization beam combiner and a polarization filter.

* * * * *